United States Patent
Morita et al.

(10) Patent No.: US 11,531,350 B2
(45) Date of Patent: Dec. 20, 2022

(54) MODEL AGGREGATION DEVICE AND MODEL AGGREGATION SYSTEM

(71) Applicant: TOYOTA JIDOSHA KABUSHIKI KAISHA, Aichi-ken (JP)

(72) Inventors: Hiroki Morita, Hiratsuka (JP); Daiki Yokoyama, Gotemba (JP); Eiki Kitagawa, Odawara (JP); Sui Kurihashi, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 414 days.

(21) Appl. No.: 16/801,152

(22) Filed: Feb. 26, 2020

(65) Prior Publication Data

US 2020/0285243 A1   Sep. 10, 2020

(30) Foreign Application Priority Data

Mar. 8, 2019   (JP) .............................. JP2019-042641

(51) Int. Cl.
| | |
|---|---|
| *G05B 13/00* | (2006.01) |
| *G05D 1/02* | (2020.01) |
| *G05B 13/02* | (2006.01) |
| *G06N 3/04* | (2006.01) |
| *G06N 3/08* | (2006.01) |

(52) U.S. Cl.
CPC ......... *G05D 1/0221* (2013.01); *G05B 13/027* (2013.01); *G05D 1/0285* (2013.01); *G06N 3/04* (2013.01); *G06N 3/08* (2013.01); *G05D 2201/0213* (2013.01)

(58) Field of Classification Search
CPC ............... G05D 1/0221; G05D 1/0285; G05D 2201/0213; G05B 13/027; G06N 3/04; G06N 3/08
USPC .......................................................... 706/23
See application file for complete search history.

(56) References Cited

U.S. PATENT DOCUMENTS

| | | | |
|---|---|---|---|
| 2015/0199617 A1 | 7/2015 | Uwajima | |
| 2017/0279696 A1* | 9/2017 | Vasseur .................. | G06N 20/00 |

(Continued)

FOREIGN PATENT DOCUMENTS

| | | |
|---|---|---|
| JP | 2012-112277 A | 6/2012 |
| JP | 2015135552 A | 7/2015 |
| WO | 2017219991 A1 | 12/2017 |

*Primary Examiner* — Tyler J Lee
*Assistant Examiner* — Tiffany P Ohman
(74) *Attorney, Agent, or Firm* — Hauptman Ham, LLP

(57) ABSTRACT

A model aggregation device includes a communication device able to communicate with a plurality of vehicles in which neural network models are learned, a storage device storing a part of the neural network models sent from the plurality of vehicles, and a control device. The neural network model outputs at least one output parameter from a plurality of input parameters. The control device is configured to, if receiving a new neural network model from one vehicle among the plurality of vehicles through the communication device, compare ranges of the plurality of input parameters which were used for learning the new neural network model and ranges of the plurality of input parameters which were used for learning a current neural network model stored in the storage device to thereby determine whether to replace the current neural network model with the new neural network model.

7 Claims, 9 Drawing Sheets

(56) References Cited

U.S. PATENT DOCUMENTS

2017/0279847 A1\* 9/2017 Dasgupta ................ H04L 12/66
2019/0228762 A1 7/2019 Wang et al.

\* cited by examiner

FIG. 5

| FIRST INPUT PARAMETER | RANGE (min, max) |
|---|---|
| SECOND INPUT PARAMETER | RANGE (min, max) |
| THIRD INPUT PARAMETER | RANGE (min, max) |
| FOURTH INPUT PARAMETER | RANGE (min, max) |
| FIFTH INPUT PARAMETER | RANGE (min, max) |
| SIXTH INPUT PARAMETER | RANGE (min, max) |

MODEL AGGREGATION DEVICE AND MODEL AGGREGATION SYSTEM

RELATED APPLICATIONS

The present application claims priority of Japanese Patent Application No. 2019-042641, filed Mar. 8, 2019, the disclosure of which is hereby incorporated by reference herein in its entirety.

FIELD

The present invention relates to a model aggregation device and a model aggregation system.

BACKGROUND

In the past, it has been known to use a neural network model outputting a predetermined output parameter from predetermined input parameters for control of a vehicle. For example, PTL 1 describes to use a learned neural network model to estimate a flow rate of intake gas taken into a combustion chamber of an internal combustion engine mounted in a vehicle.

CITATIONS LIST

Patent Literature

[PTL 1] Japanese Unexamined Patent Publication No. 2012-112277

SUMMARY

Technical Problem

In this regard, to improve the precision of a neural network model, it is necessary to perform learning of the neural network model in advance. In learning of a neural network model, training data sets comprised of combinations of measured values of input parameters and measured values of output parameters are used.

The measured values of the input parameters and output parameters can be acquired using sensors etc., during actual running of a vehicle. For this reason, it may be considered to prepare training data sets in the vehicle and perform learning of the neural network model in the vehicle. Further, to apply neural network models to other vehicles etc., it is desirable to collect the neural network models learned at vehicles and store them in a storage device outside of the vehicles.

However, if trying to store all of the neural network models sent from a plurality of the vehicles in a storage device, the storage capacity of the storage device will be reached early and new neural network models will no longer be able to be stored in the storage device.

Therefore, considering the above problem, an object of the present invention is to suppress a shortage in the storage capacity of a storage device if collecting the neural network models learned at vehicles and storing them in a storage device outside of the vehicles.

Solution to Problem

The summary of the present disclosure is as follows.
(1) A model aggregation device comprising a communication device able to communicate with a plurality of vehicles in which neural network models are learned, a storage device storing a part of the neural network models sent from the plurality of vehicles, and a control device, wherein the neural network model outputs at least one output parameter from a plurality of input parameters, and the control device is configured to, if receiving a new neural network model from one vehicle among the plurality of vehicles through the communication device, compare ranges of the plurality of input parameters which were used for learning the new neural network model and ranges of the plurality of input parameters which were used for learning a current neural network model stored in the storage device to thereby determine whether to replace the current neural network model with the new neural network model.

(2) The model aggregation device described in above (1), wherein the control device is configured to replace the current neural network model with the new neural network model if ranges of the plurality of input parameters which were used for learning the new neural network model are broader than ranges of the plurality of input parameters which were used for learning the current neural network model, a number of combinations of the plurality of input parameters which were used for learning the new neural network model is smaller than a number of combinations of the plurality of input parameters which were used for learning the current neural network model, and date and time when the new neural network model finishes being learned is later than date and time when the current neural network model finishes being learned.

(3) The model aggregation device described in above (1) or (2), wherein the control device is configured to replace the current neural network model with the new neural network model if ranges of the plurality of input parameters which were used for learning the new neural network model are narrower than ranges of the plurality of input parameters which were used for learning the current neural network model, a number of combinations of the plurality of input parameters which were used for learning the new neural network model is greater than a number of combinations of the plurality of input parameters which were used for learning the current neural network model, and date and time when the new neural network model finishes being learned is later than date and time when the current neural network model finishes being learned.

(4) The model aggregation device described in above (1), wherein the control device is configured to replace the current neural network model with the new neural network model if ranges of the plurality of input parameters which were used for learning the new neural network model are broader than ranges of the plurality of input parameters which were used for learning the current neural network model.

(5) The model aggregation device described in any one of above (1) to (4), wherein the control device is configured to replace the current neural network model with the new neural network model if ranges of the plurality of input parameters which were used for learning the new neural network model are equal to ranges of the plurality of input parameters which were used for learning the current neural network model and a number of combinations of the plurality of input parameters which were used for learning the new neural network model is greater than a number of combinations of the plurality of input parameters which were used for learning the current neural network model.

(6) The model aggregation device described in any one of above (1) to (5), wherein the control device is configured not to replace the current neural network model with the new neural network model if a value of at least one of the plurality of input parameters which were used for learning the new neural network model is abnormal.

(7) A model aggregation system comprising a server and a plurality of vehicles, wherein each of the plurality of vehicles comprises a first communication device able to communicate with the server and a first control device configured to perform learning of a neural network model outputting at least one output parameter from a plurality of input parameters, the server comprises a second communication device able to communicate with the plurality of vehicles, a storage device storing a part of the neural network models sent from the plurality of the vehicles, and a second control device, and the second control device is configured to, if receiving a new neural network model from one vehicle among the plurality of vehicles through the first communication device and the second communication device, compare ranges of the plurality of input parameters which were used for learning the new neural network model and ranges of the plurality of input parameters which were used for learning a current neural network model stored in the storage device to thereby determine whether to replace the current neural network model with the new neural network model.

Advantageous Effects of Invention

According to the present invention, it is possible to suppress a shortage in the storage capacity of a storage device if collecting the neural network models learned at vehicles and storing them in a storage device outside of the vehicles.

BRIEF DESCRIPTION OF DRAWINGS

FIG. 5 is a view showing ranges of a plurality of input parameters used for learning a neural network model.

DESCRIPTION OF EMBODIMENTS

Figure 1:
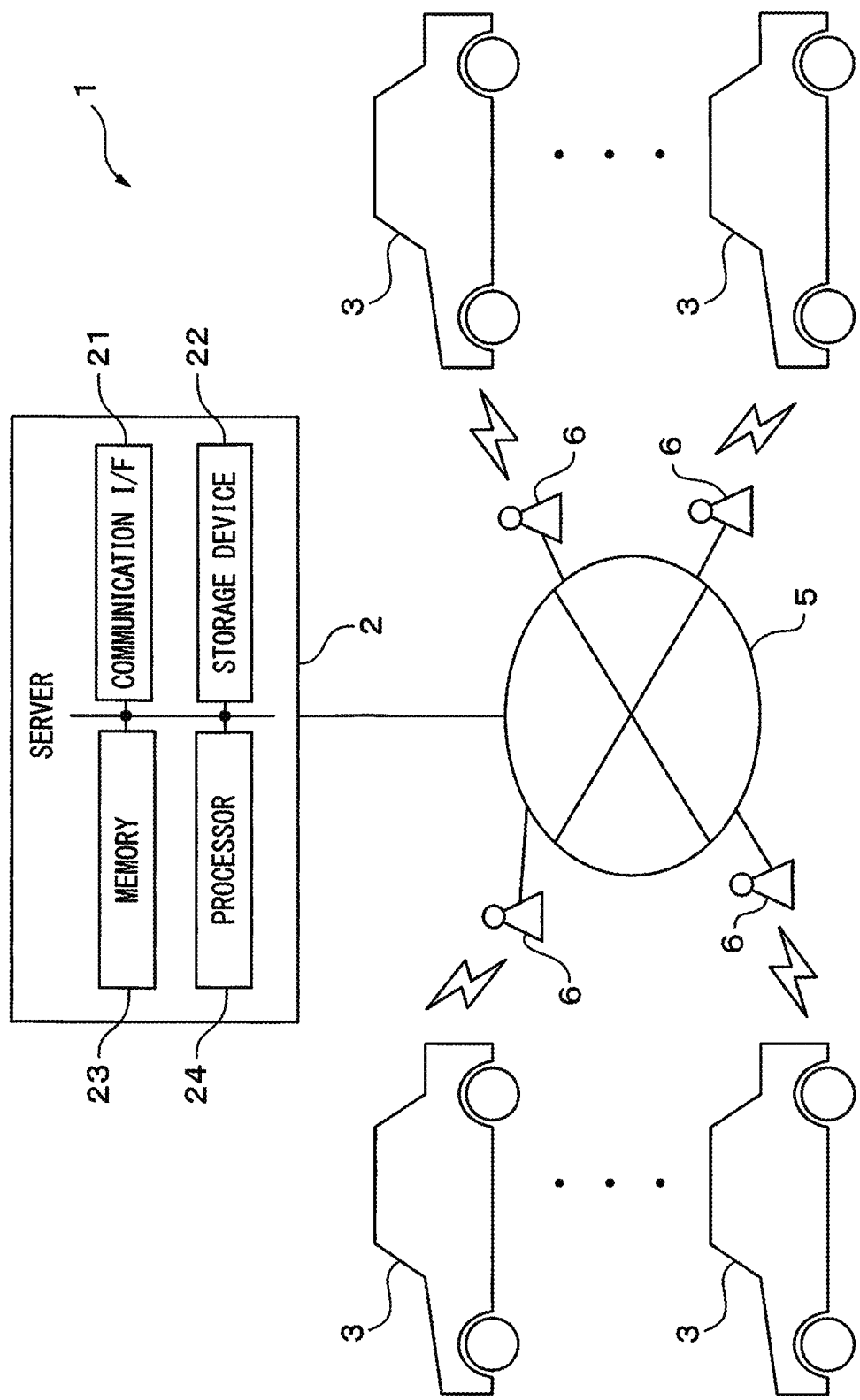
FIG. 1 is a schematic view of a configuration of a model aggregation system according to a first embodiment of the present invention.

Below, referring to the drawings, embodiments of the present invention will be explained in detail. Note that, in the following explanation, similar component elements are assigned the same reference signs.

<First Embodiment>

First, referring to FIG. 1 to FIG. 5, a first embodiment of the present invention will be explained. FIG. 1 is a schematic view of a configuration of a model aggregation system according to the first embodiment of the present invention. The model aggregation system 1 is provided with a server 2 and a plurality of vehicles 3.

As shown in FIG. 1, the server 2 is provided outside of the plurality of vehicles 3 and is provided with a communication interface 21, storage device 22, memory 23, and processor 24. Note that, the server 2 may be further provided with an input device such as a keyboard and mouse and an output device such as a display etc. Further, the server 2 may be configured by a plurality of computers. The server 2 is one example of a model aggregation device.

The communication interface 21 can communicate with the plurality of vehicles 3, so the server 2 can communicate with the plurality of vehicles 3. Specifically, the communication interface 21 has an interface circuit for connecting the server 2 to the communication network 5. The server 2 communicates with the plurality of vehicles 3 through the communication interface 21, communication network 5, and wireless base station 6. The communication interface 21 is one example of a communication device.

The storage device 22, for example, has a hard disk drive (HDD), solid state drive (SSD), or optical storage medium. The storage device 22 stores various types of data, for example, stores vehicle information, computer programs for the processor 24 to perform various processing, etc. The storage device 22 is one example of a storage device.

The memory 23, for example, has a semiconductor memory such as a random access memory (RAM). The memory 23, for example, stores various data etc., used when various processing is performed by the processor 24.

The communication interface 21, storage device 22, and memory 23 are connected through signal wires to the processor 24. The processor 24 has one or more CPUs and peripheral circuits and performs various processing. Note that, the processor 24 may further have processing circuits such as arithmetic logic units or numerical calculation units. The processor 24 is an example of a control device.

Figure 2:
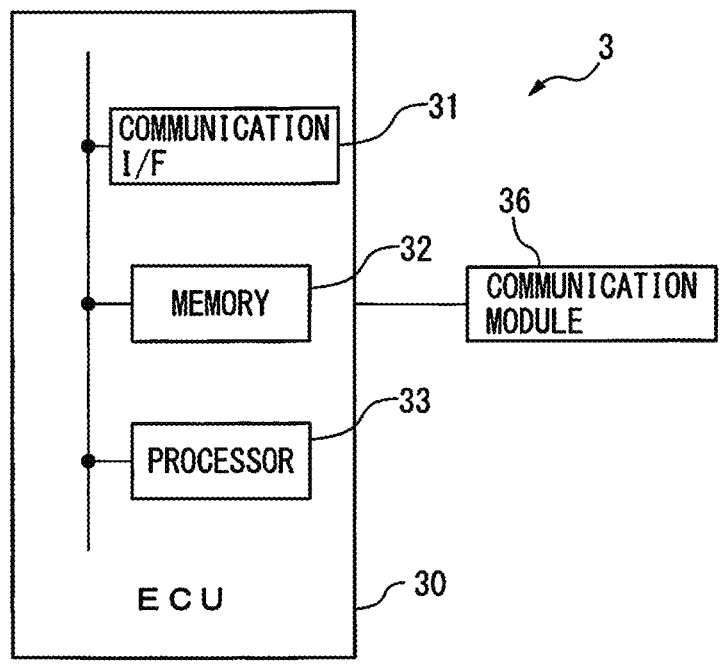
FIG. 2 is view schematically showing a part of a configuration of a vehicle.

FIG. 2 is a view schematically showing a part of the configuration of a vehicle 3. The vehicle 3 is provided with an electronic control unit (ECU) 30. The ECU 30 includes a communication interface 31, memory 32, and processor 33 and performs various control operations of the vehicle 3. Note that, in the present embodiment, a single ECU 30 is provided, but a plurality of ECUs may be provided for the different functions. The ECU 30 is one example of a control device.

The communication interface 31 is an interface circuit for connecting the ECU 30 to an internal vehicle network based on the CAN (Controller Area Network) or other standard. The ECU 30 communicates with other vehicle-mounted devices through the communication interface 31.

The memory 32, for example, has a volatile semiconductor memory (for example, a RAM) and nonvolatile semiconductor memory (for example, a ROM). The memory 32 stores programs run by the processor 33, various data used when the various processings are performed by the processor 33, etc.

The communication interface 31 and memory 32 are connected to the processor 33 through signal wires. The processor 33 has one or more CPUs (central processing units) and their peripheral circuits and performs various processing. Note that, the processor 33 may further have processing circuits such as arithmetic logic units or numerical calculation units.

Further, the vehicle 3 is provided with a communication module 36 able to communicate with the server 2. The communication module 36 is connected to the ECU 30 through a signal wire and is, for example, configured as a data communication module (DCM). The vehicle 3 communicates with the server 2 through the communication module 36, wireless base station 6, and communication network 5. The communication module 36 is one example of a communication device.

Figure 3:
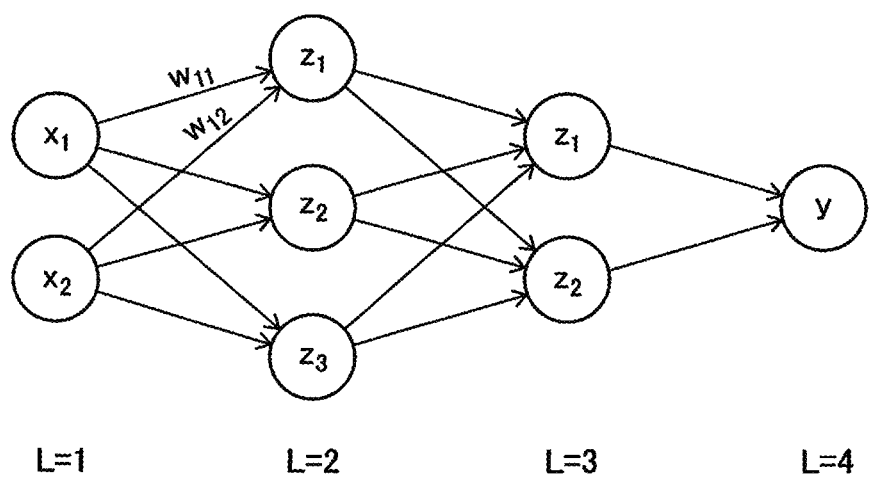
FIG. 3 shows one example of a neural network model having a simple configuration.

The model aggregation system 1 has the configuration such as explained above and collects the neural network models from the plurality of vehicles 3. First, referring to FIG. 3, a neural network model will be explained in outline. FIG. 3 shows one example of a neural network model having a simple configuration.

The circle marks in FIG. 3 show artificial neurons. An artificial neuron is usually called a "node" or "unit" (in this Description, called a "node"). In FIG. 3, L=1 indicates an input layer, L=2 and L=3 indicates hidden layers, and L=4 indicates an output layer. Note that, the hidden layers are also called "intermediate layers".

In FIG. 3, $x_1$ and $x_2$ indicate nodes of the input layer (L=1) and output values from the nodes, while "y" indicates a node of the output layer (L=4) and its output values. Similarly, the $z_1^{(L=2)}$, $z_2^{(L=2)}$, and $z_3^{(L=2)}$ indicates nodes of the hidden layers (L=2) and the output values from the nodes, while $z_1^{(L=3)}$ and $z_2^{(L=3)}$ indicate nodes of the hidden layers (L=3) and the output values from the nodes.

At the nodes of the input layer, inputs are output as they are. On the other hand, at the nodes of the hidden layer (L=2), the output values $x_1$ and $x_2$ of the nodes of the input layer are input. At the nodes of the hidden layers (L=2), corresponding weights "w" and biases "b" are used to calculate total input values "u". For example, in FIG. 3, the total input values $u_k^{(L=2)}$ calculated at the nodes shown by $z_k^{(L=2)}$ (k=1, 2, 3) of the hidden layer (L=2) become as in the following equation (M is the number of nodes of the input layer).

$$u_k^{(L=2)} = \sum_{m=1}^{M} (x_m \cdot w_{km}^{(L=2)}) + b_k \quad \text{[Equation 1]}$$

Next, this total input values $u_k^{(L=2)}$ are converted by the activation function "f" and are output as the output values $z_k^{(L=2)}$ ($=f(u_k^{(L=2)})$) from the nodes shown by $z_k^{(L=2)}$ of the hidden layers (L=2). On the other hand, the nodes of the hidden layer (L=3) receive as input the output values $z_1^{(L=2)}$, $z_2^{(L=2)}$, and $z_3^{(L=2)}$ of the nodes of the hidden layer (L=2). At the nodes of the hidden layer (L=3), the corresponding weights "w" and biases "b" are used to calculate the total input values "u" ($=\Sigma z \cdot w + b$). The total input values "u" are similarly converted by an activation function and are output from the nodes of the hidden layers (L=3) as the output values $z_1^{(L=3)}$ and $z_2^{(L=3)}$. The activation function is for example a Sigmoid function σ.

Further, the node of the output layer (L=4) receives as input the output values $z_1^{(L=3)}$ and $z_2^{(L=3)}$ of the nodes of the hidden layer (L=3). At the node of the output layer, the corresponding weights "w" and biases "b" are used to calculate the total input value "u" ($\Sigma z \cdot w + b$) or only the corresponding weights "w" are used to calculate the total input value "u" ($\Sigma z \cdot w$). For example, at the node of the output layer, an identity function is used as the activation function. In this case, the total input value "u" calculated at the node of the output layer is output as it is as the output value "y" from the node of the output layer.

In the present embodiment, a neural network model outputting at least one output parameter (output value) from a plurality of input parameters (input values) is used in a vehicle 3 for controlling the vehicle 3. As the input parameters and output parameters of such a neural network model, parameters relating to an internal combustion engine mounted in the vehicle 3, parameters relating to the driving environment of the vehicle 3, etc., are used. For example, as the input parameters, the engine speed, opening degree of the throttle valve, amount of intake air (total of amount of fresh air and amount of EGR gas) or pressure of intake air, temperature of cooling water of internal combustion engine, angle of camshaft, intake temperature, vehicle speed, and target air-fuel ratio of air-fuel mixture are used, while as the output parameter, an amount of correction of the target air-fuel ratio is used.

Further, if the vehicle 3 is a hybrid vehicle (HV) or plug-in hybrid vehicle (PHV) provided with an internal combustion engine and motor as drive sources, the following such input parameters and output parameters are used. For example, as the input parameters, the state of charge (SOC) of the battery, vehicle speed, accelerator opening degree, temperature of cooling water of the internal combustion engine, temperature of the battery, electrical load due to use of an air-conditioner etc., atmospheric pressure or altitude, longitude, latitude, day of the week, and hours are used, while as the output parameters, the target amount of charging and discharging of the battery in the HV mode is used. Note that, in the HV mode, the internal combustion engine and motor are driven so that the SOC of the battery becomes the target value. Further, if the day of the week is used as the input parameter, the day of the week is converted to a numerical value. For example, 1 to 7 are allocated to Monday to Sunday.

Further, as the input parameters, the SOC of the battery, vehicle speed, accelerator opening degree, temperature of the motor or temperature of the inverter, longitude, and latitude are used. As the output parameter, the result of judgment of startup of the internal combustion engine in an EV mode may be used. Note that, in the EV mode, as the drive source, only a motor is driven. In this case, for example, if zero is output from the neural network model, the internal combustion engine is stopped. The internal combustion engine is started if "1" is output from the neural network model.

Further, if the vehicle 3 is a plug-in hybrid vehicle (PHV) provided with an internal combustion engine and motor as the drive source and enabling the battery to be charged by an outside power supply, the following such input parameters and output parameters are used. For example, as the input parameters, the SOC of the battery, vehicle speed, accelerator opening degree, outside air temperature, temperature of the cooling water of the internal combustion engine, temperature of the oil circulating through the internal combustion engine, longitude, latitude, day of the week, and hours are used. As the output parameter, the driving mode (EV mode or HV mode) is used. In this case, for example, if zero is output from the neural network model, the driving mode is set to the EV mode, while if "1" is output from the neural network model, the driving mode is set to the HV mode.

The neural network model used in the vehicle 3 is stored in the memory 32 of the ECU 30 or another storage device provided at the vehicle 3. The ECU 30 inputs the input parameters to the neural network model to thereby make the neural network model output the output parameter. At this time, as values of the input parameters, for example, the values detected by sensors etc., provided at the vehicle 3 or values calculated at the ECU 30 are used. By using the neural network model, it is possible to obtain a suitable value of the output parameter corresponding to predetermined values of the input parameters.

To improve the precision of a neural network model, it is necessary to perform learning of the neural network model in advance. In the present embodiment, the ECU 30 of the vehicle 3 performs the learning of the neural network model. That is, the neural network model is learned in the vehicle 3 rather than the server 2.

In learning of the neural network model, training data sets comprised of combinations of measured values of the plurality of input parameters and the measured value of at least one output parameter corresponding to these measured values (truth data) are used. For this reason, the ECU 30 acquires the measured values of the plurality of input parameters and the measured value of at least one output parameter corresponding to these measured values. The measured values of the input parameters and output parameters are, for example, acquired as values detected by sensors etc., provided at the vehicle 3 or values calculated or determined at the ECU 30. The training data set prepared by combining these measured values is stored in the memory 32 of the ECU 30 or another storage device provided at the vehicle 3.

The ECU 30 performs the learning of the neural network using a large number of training data sets. For example, the ECU 30 repeatedly updates the weights "w" and biases "b" in the neural network model by the known error backpropagation algorithm so that the difference between the output value of the neural network model and the measured value of the output parameter becomes smaller. As a result, the neural network model is learned and a learned neural network model is generated. The information of the learned neural network model (structure of the model, weights "w", biases "b", etc. is stored in the memory 32 of the ECU 30 or another storage device provided at the vehicle 3.

To apply neural network models to other vehicles etc., it is desirable to collect the neural network models learned at the vehicles and store them in the storage device 22 of the server 2. For this reason, the learned neural network models (specifically, information of the learned neural network models) are transmitted from the vehicles 3 to the server 2. After that, the server 2 sends the learned neural network models to other vehicles. By doing this, even in vehicles in which the neural network models are not learned, it is possible to efficiently utilize the neural network models. Further, the neural network models used in the vehicles can be changed to high precision neural network models sent from the server 2.

However, if trying to store all of the neural network models sent from a plurality of vehicles 3 in the storage device 22 of the server 2, the storage capacity of the storage device 22 is reached early and new neural network models can no longer be stored in the storage device 22. For this reason, in the present embodiment, a part of the neural network models in which learning was performed at the plurality of the vehicles 3 are stored in the storage device 22.

Specifically, when receiving a new neural network model from one vehicle among the plurality of vehicles 3 through the communication module of the vehicle 3 and the communication interface 21 of the server 2, the processor 24 of the server 2 compares the ranges of the plurality of input parameters used for learning of the new neural network model and the ranges of the plurality of input parameters used for learning of the current neural model stored in the storage device 22 so as to determine whether to replace the current neural network model with the new neural network model. By doing this, the neural network model stored in the storage device 22 is selected, so it is possible to keep the storage capacity of the storage device 22 from being reached.

Further, as the neural network model stored in the storage device 22, it is preferable to select a high precision neural network model. Normally, to use the neural network model to output a suitable value of an output parameter from various values of input parameters, it is necessary to use a training data set including a broad range of input parameters to perform learning of the neural network model. For this reason, it is considered that the broader the ranges of the input parameters used for learning of the neural network model, the higher the precision of the neural network model.

Therefore, in the present embodiment, the processor 24 of the server 2 replaces the current neural network model with the new neural network model if the ranges of the plurality of input parameters used for learning of the new neural network model are broader than the ranges of the plurality of input parameters used for learning of the current neural network model. Due to this, it is possible to keep the storage capacity of the storage device 22 from being reached while improving the precision of the neural network model stored in the storage device 22.

<Processing for Replacement of Models>

Figure 4:
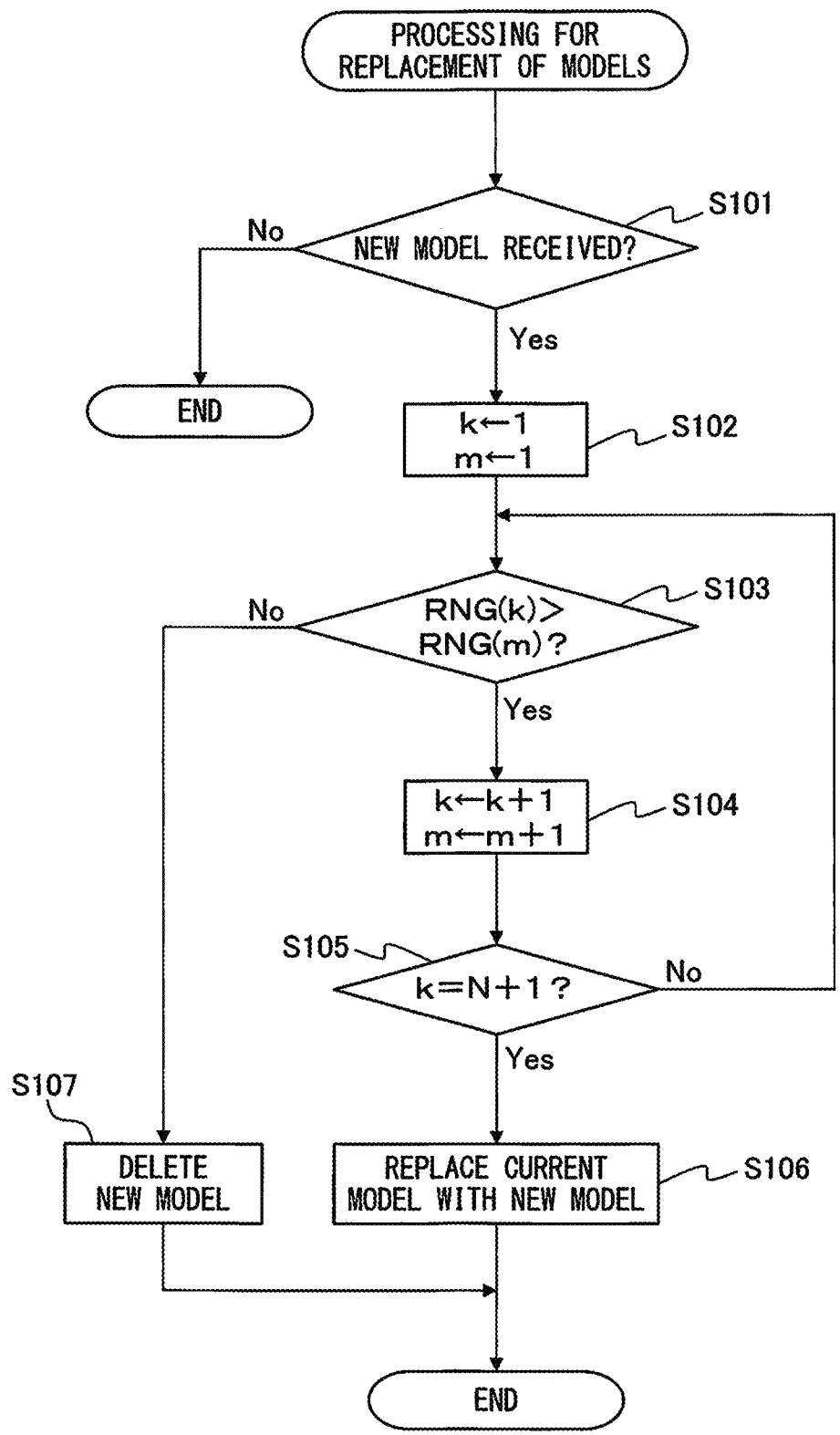
FIG. 4 is a flow chart showing a control routine of processing for replacement of models in the first embodiment.

Below, referring to the flow chart of FIG. 4, the above-mentioned control will be explained in detail. FIG. 4 is a flow chart showing a control routine of processing for replacement of models in the first embodiment. The present control routine is repeatedly performed by the processor 24 of the server 2. In the present control routine, it is judged whether to replace the current neural network model stored in the storage device 22 of the server 2 (below, referred to as the "current model") with a new neural network model received from a vehicle 3 (below, referred to as the "new model").

First, at step S101, it is judged whether a new model has been received from a vehicle 3. If it is judged that a new model has not been received from a vehicle 3, the present control routine ends. On the other hand, if it is judged that a new model has been received from a vehicle 3, the present control routine proceeds to step S102.

At step S102, the input parameter no. "k" of the new model is set to "1", and the input parameter no. "m" of the current model is set to "1".

Next, at step S103, it is judged whether a range RNG(k) of a k-th input parameter used for learning of the new model is broader than a range RNG(m) of an m-th input parameter used for learning of the current model. In the present control routine, the values of "k" and "m" become equal. Therefore, at step S103, the ranges of the input parameters used for learning are compared for each input parameter between the new model and the current model.

FIG. 5 is a view showing ranges of the plurality of input parameters used for learning of the neural network model. In the example of FIG. 5, in the neural network model, the six input parameters of the first input parameter to the sixth input parameter are used. That is, the number of nodes of the input layer of the neural network model is six. Note that, in the new model and the current model, the same input parameters and output parameters are used.

The ranges of the input parameters are calculated as the difference between the minimum values and maximum values of the measured values of the input parameters included in the training data sets used for learning of the neural network model. For example, if the first input parameter is the vehicle speed and the measured values of 30 km/h to 80 km/h are used for learning, the range of the first input parameter becomes 50 (=80−30) and is expressed as (30, 80).

The minimum value and maximum value and ranges of the input parameters used for learning of the new model are stored as a part of the information of the learned neural network model in the memory 32 of the ECU 30 or another storage device provided in the vehicle 3. For this reason, the processor 24 of the server 2 can acquire the ranges of the input parameters used for learning of the new model when receiving the new model from the vehicle 3.

Further, when the new model is stored in the storage device 22, the minimum value and maximum value and ranges of the input parameters used for learning of the new model are stored in the storage device 22. For this reason, the processor 24 of the server 2 can acquire the ranges of the input parameters used for learning of the current model.

If at step S103 it is judged that the range RNG(k) of the k-th input parameter used for learning of the new model is equal to or less than the range RNG(m) of the m-th input parameter used for learning of the current model, the present control routine proceeds to step S107. At step S107, the new model is deleted from the storage device 22. That is, the current model is maintained and the new model is not stored in the storage device 22. After step S107, the present control routine ends.

On the other hand, if it is judged that the range RNG(k) of the k-th input parameter used for learning of the new model is broader than the range RNG(m) of the m-th input parameter used for learning of the current model, the present control routine proceeds to step S104. At step S104, "1" is added to the input parameter no. "k" of the new model, and "1" is added to the input parameter no. "m" of the current model.

Next, at step S105, it is judged whether the input parameter no. "k" of the new model is N+1. N is the number of input parameters input to the neural network model and is 6 in the example of FIG. 5. For this reason, at step S105, it is judged whether the ranges of all of the input parameters are compared between the new model and the current model. If it is judged that the input parameter no. "k" of the new model is equal to or less than N, the present control routine returns to step S103 where the range of the next input parameter is compared.

On the other hand, if at step S105 it is judged that the input parameter no. "k" of the new model is N+1, the present control routine proceeds to step S106. In this case, the ranges of all of the input parameters used for learning of the new model are broader than the ranges of all of the input parameters used for learning of the current model. For this reason, at step S106, the current model is replaced with the new model. That is, the current model is deleted from the storage device 22, while the new model is stored in the storage device 22. After step S106, the present control routine ends.

Note that, if there is no current model having the same input parameters and output parameters as the new model, the new model is stored in the storage device 22.

<Second Embodiment>

The configuration and control of the model aggregation system and model aggregation device according to a second embodiment are basically the same as the configuration and control of the model aggregation system and model aggregation device according to the first embodiment except for the points explained below. For this reason, below, the second embodiment of the present invention will be explained focusing on parts different from the first embodiment.

In the first embodiment, if the ranges of the plurality of input parameters which were used for learning of the new model are equal to the ranges of the plurality of input parameters which were used for learning of the current model, the new model is deleted from the storage device 22. However, in this case, the precision of the new model is not necessarily equal to or less than the precision of the current model.

Usually, if the ranges of the pluralities of input parameters used for learning are equal, the greater the number of combinations of the plurality of input parameters used for learning, that is, the greater the number of training data sets, the higher the precision of the learned neural network model.

For this reason, in the second embodiment, if the ranges of the plurality of input parameters which were used for learning of the new model are equal to the ranges of the plurality of input parameters which were used for learning of the current model, the processor 24 of the server 2 replaces the current model with the new model if the number of combinations of the plurality of input parameters which were used for learning of the new model is greater than the number of combinations of the plurality of input parameters which were used for learning of the current model. By doing this, it is possible to keep the storage capacity of the storage device 22 from being reached while more effectively improving the precision of the neural network model stored in the storage device 22.

<Processing for Replacement of Models>

Figure 6:
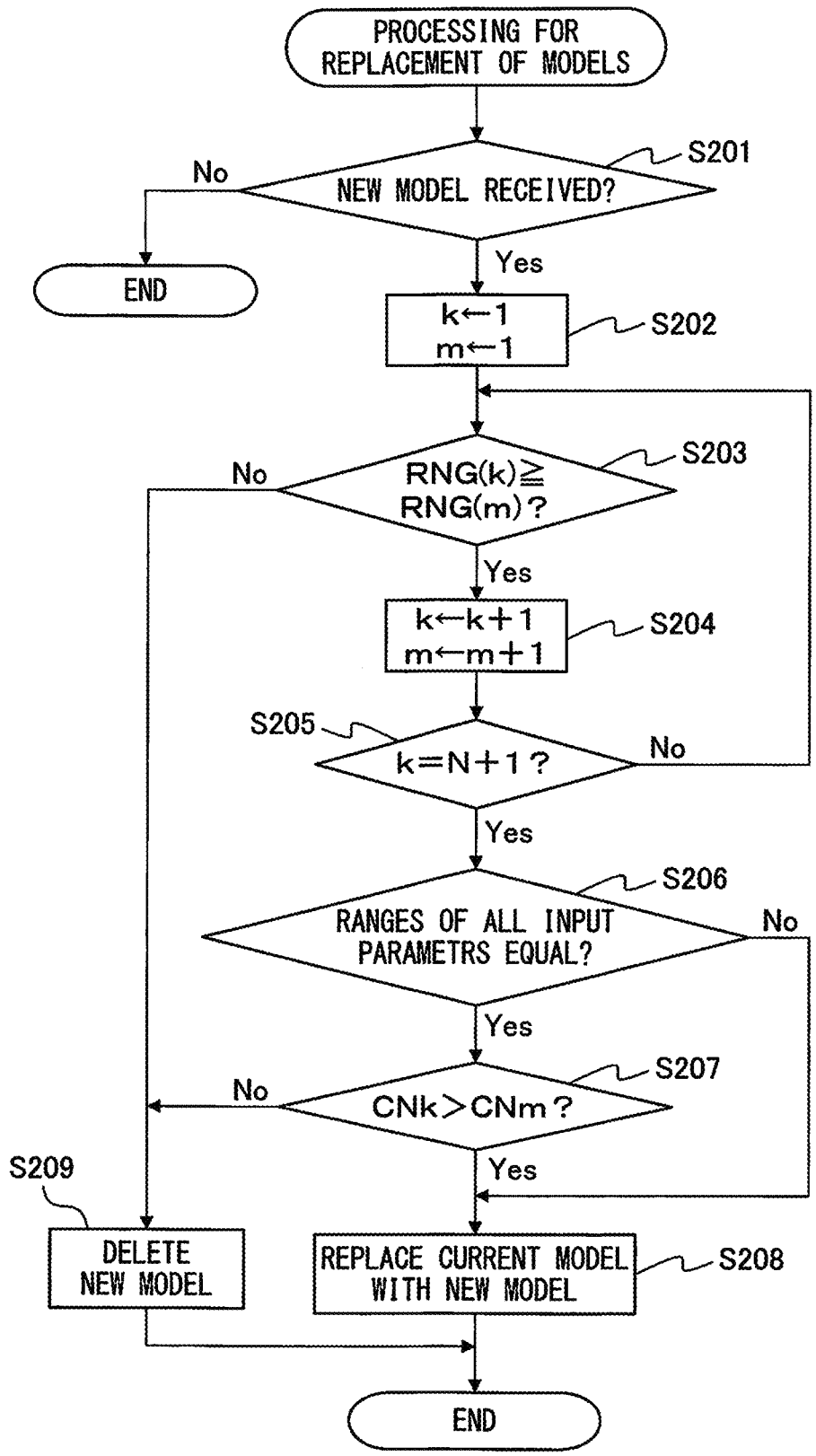
FIG. 6 is a flow chart showing a control routine of processing for replacement of models in a second embodiment.

FIG. 6 is a flow chart showing a control routine of processing for replacement of models in the second embodiment. The present control routine is repeatedly performed by the processor 24 of the server 2.

Step S201 to step S205 are similar to step S101 to step S105 of FIG. 4, so the explanation will be omitted. If at step S205 it is judged that the input parameter no. "k" of the new model is N+1, the present control routine proceeds to step S206.

At step S206, it is judged whether the ranges of all of the input parameters are equal between the new model and the current model. If the ranges of all of the input parameters used for learning of the new model are broader than the ranges of all of the input parameters used for learning of the current model, at step S206 it is judged that the ranges of all of the input parameters are not equal and the present control routine proceeds to step S208.

At step S208, the current model is replaced by the new model. That is, the current model is deleted from the storage device 22, while the new model is stored in the storage device 22. After step S208, the present control routine ends.

On the other hand, if at step S206 it is judged that the ranges of all of the input parameters are equal, the present control routine proceeds to step S207. At step S207, it is judged whether the number CNk of combinations of the plurality of input parameters which were used for learning of the new model is greater than the number CNm of combinations of the plurality of input parameters which were used for learning of the current model. That is, it is judged whether the number of training data sets used for learning of the new model is greater than the number of training data sets used for learning of the current model.

In the second embodiment, the number of combinations of the plurality of input parameters used for learning of the neural network model is stored as a part of the information of the learned neural network models in the memory 32 of the ECU 30 or another storage device provided in the vehicle 3. For this reason, when receiving a new model from the vehicle 3, the processor 24 of the server 2 can acquire the number of combinations of the plurality of input parameters which were used for learning of the new model.

Further, when the new model is stored in the storage device 22, the number of combinations of the plurality of input parameters which were used for learning of the new model is stored in the storage device 22. For this reason, the processor 24 of the server 2 can acquire the number of combinations of the plurality of input parameters which were used for learning of the current model.

If at step S207 it is judged that the number CNk of combinations of the plurality of input parameters is equal to or less than the number CNm of combinations of the plurality of input parameters, the present control routine proceeds to step S209. At step S209, the new model is deleted from the storage device 22. That is, the current model is maintained and the new model is not stored in the storage device 22. After step S209, the present control routine ends.

On the other hand, if at step S207 it is judged that the number CNk of combinations of the plurality of input parameters is greater than the number CNm of combinations of the plurality of input parameters, the present control routine proceeds to step S208. At step S208, the current model is replaced by the new model. After step S208, the present control routine ends.

<Third Embodiment>

The configuration and control of the model aggregation system and model aggregation device according to a third embodiment are basically the same as the configuration and control of the model aggregation system and model aggregation device according to the first embodiment except for the points explained below. For this reason, below, the third embodiment of the present invention will be explained focusing on parts different from the first embodiment.

As explained above, in learning of a neural network model, a large number of training data sets are used. However, if abnormal values are acquired as measured values of the input parameters due to deterioration of the sensors etc., the neural network model would be learned using the training data set including the abnormal values. In this case, the neural network model would be adapted to the abnormal values and the learned neural network model would fall in precision.

Further, if the input parameters used for learning of the neural network model include abnormal values, the ranges of the input parameters used for learning of the neural network model tend to become broader. For this reason, by replacing the new model with the broad ranges of the input parameters with the current model, the precision of the neural network model is liable to fall.

Therefore, in the third embodiment, the processor 24 of the server 2 does not replace the current model with the new model if at least one value of the plurality of input parameters which were used for learning of the new model is abnormal. Specifically, if at least one value of the plurality of input parameters which were used for learning of the new model is abnormal, the processor 24 deletes the new model from the storage device 22 without comparing the ranges of the input parameters between the new model and the current model. By doing this, it is possible to keep the storage capacity of the storage device 22 from being reached while effectively improving the precision of the neural network model stored in the storage device 22.

<Processing for Replacement of Models>

Figure 7:
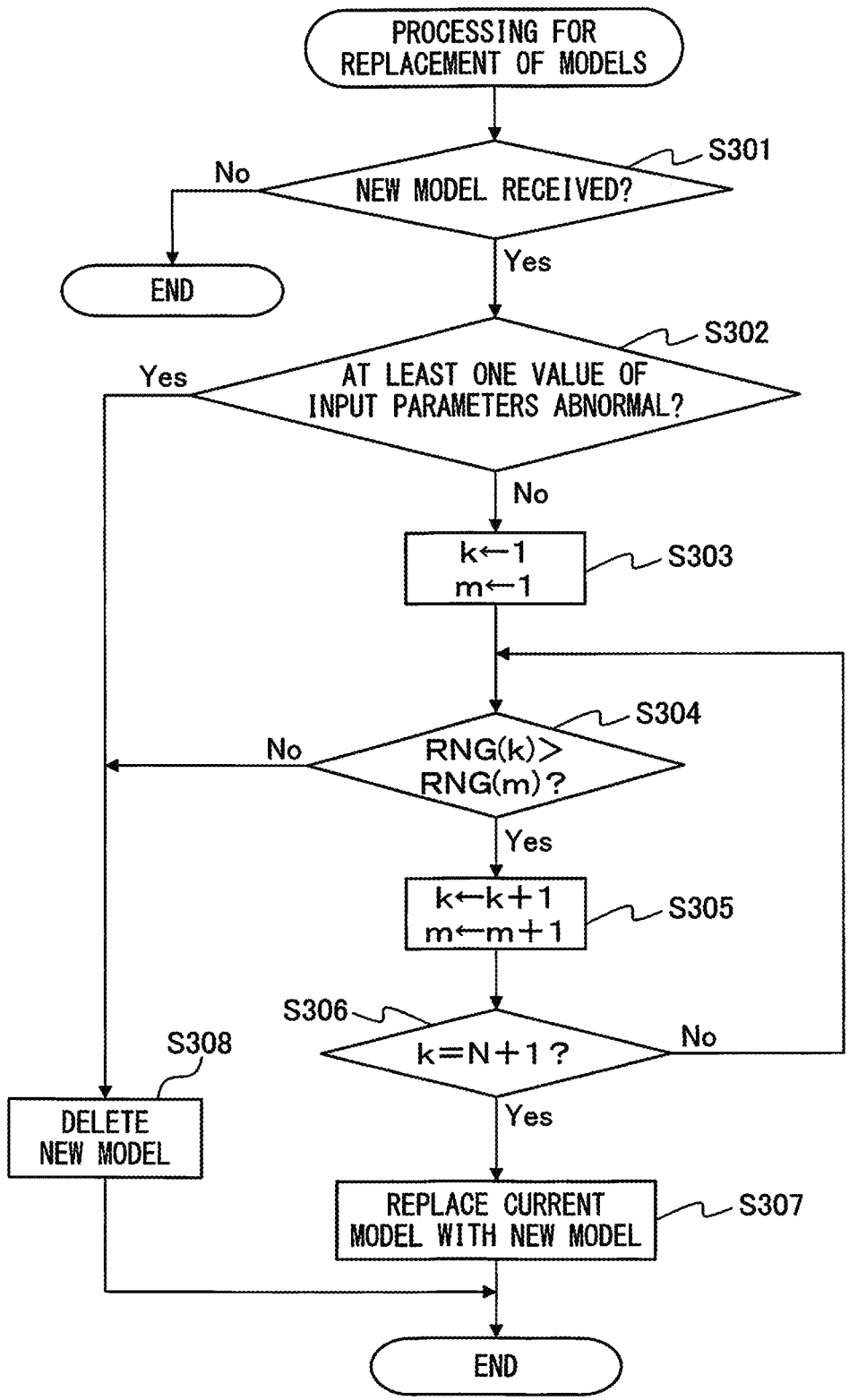
FIG. 7 is a flow chart showing a control routine of processing for replacement of models in a third embodiment.

FIG. 7 is a flow chart showing a control routine of processing for replacement of models in the third embodiment. The present control routine is repeatedly performed by the processor 24 of the server 2.

First, at step S301, it is judged whether a new model has been received from the vehicle 3. If it is judged that a new model has not been received from the vehicle 3, the present control routine ends. On the other hand, if it is judged that a new model has been received from the vehicle 3, the present control routine proceeds to step S302.

At step S302, it is judged whether at least one value of the plurality of input parameters which were used for learning of the new model is abnormal. For example, normal ranges are set in advance for the plurality of input parameters, and it is judged whether the maximum values and minimum values of the plurality of input parameters which were used for learning of the new model are included in the normal ranges. In this case, if the maximum values and minimum values of all of the input parameters are included in the normal ranges, it is judged that none of the values of the plurality of input parameters which were used for learning of the new model are abnormal. On the other hand, if the maximum value or minimum value of at least one input parameter is not included in the normal range, it is judged that at least one value of the plurality of input parameters which were used for learning of the new model is abnormal.

If at step S302 it is judged that at least one value of the plurality of input parameters is abnormal, the present control routine proceeds to step S308. At step S308, the new model is deleted from the storage device 22. That is, the current model is maintained and the new model is not stored in the storage device 22. After step S308, the present control routine ends.

On the other hand, if at step S302 it is judged that none of the values of the plurality of input parameters which were used for learning of the new model is abnormal, the present control routine proceeds to step S303. Step S303 to step S308 are similar to step S102 to step S107 of FIG. 4, so explanations will be omitted.

<Fourth Embodiment>

The configuration and control of the model aggregation system and model aggregation device according to a fourth embodiment are basically the same as the configuration and control of the model aggregation system and model aggregation device according to the first embodiment except for the points explained below. For this reason, below, the fourth embodiment of the present invention will be explained focusing on parts different from the first embodiment.

As explained above, the broader the ranges of the input parameters used for learning of a neural network model, the higher the precision of the learned neural network model tends to become. Further, the greater the number of combinations of the plurality of input parameters used for learning of a neural network model, that is, the greater the number of training data sets used for learning of a neural network model, the higher the precision of the learned neural network model tends to become.

However, when a new model and current model are compared, sometimes the ranges of the plurality of input parameters used for learning of one model become broader than the ranges of the plurality of input parameters used for learning of the other model and the number of training data sets used for learning of the other model becomes greater than the number of training data sets used for learning of the one model. In this case, it may be considered that a model with a later time when learning finishes reflects a newer state of the vehicle. That is, it may be considered that a model with a later time when learning finishes is higher in precision than a model with an earlier time when learning finishes.

For this reason, in the fourth embodiment, the processor 24 of the server 2 replaces the current model with the new model if the ranges of the plurality of input parameters which were used for learning of the new model are broader than the ranges of the plurality of input parameters which were used for learning of the current model and the number of combinations of the plurality of input parameters which were used for learning of the new model is smaller than the number of combinations of the plurality of input parameters which were used for learning of the current model and the time when the new model finishes being learned is later than the time when the current model finishes being learned.

Further, the processor 24 replaces the current model with the new model if the ranges of the plurality of input parameters which were used for learning of the new model are narrower than the ranges of the plurality of input parameters which were used for learning of the current model, the number of combinations of the plurality of input parameters which were used for learning of the new model is greater than the number of combinations of the plurality of input parameters which were used for learning of the current model, and the time when the new model finishes being learned is later than the time when the current model finishes being learned.

By selecting the neural network model stored in the storage device 22 in the above way, it is possible to keep the storage capacity of the storage device 22 from being reached while more effectively improving the precision of the neural network model stored in the storage device 22.

<Processing for Replacement of Models>

Figure 8A:
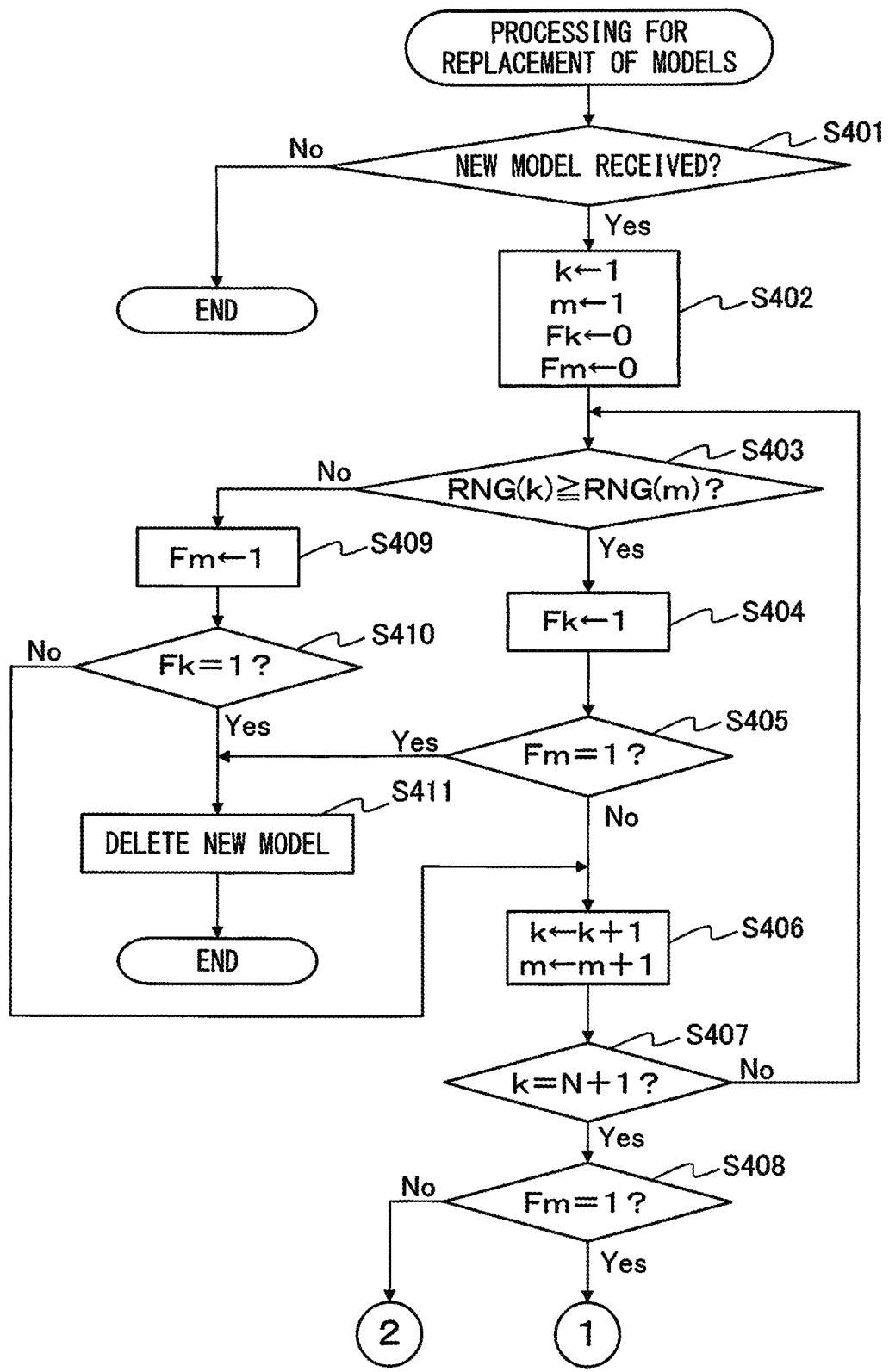
FIG. 8A is a flow chart showing a control routine of processing for replacement of models in a fourth embodiment.
Figure 8B:
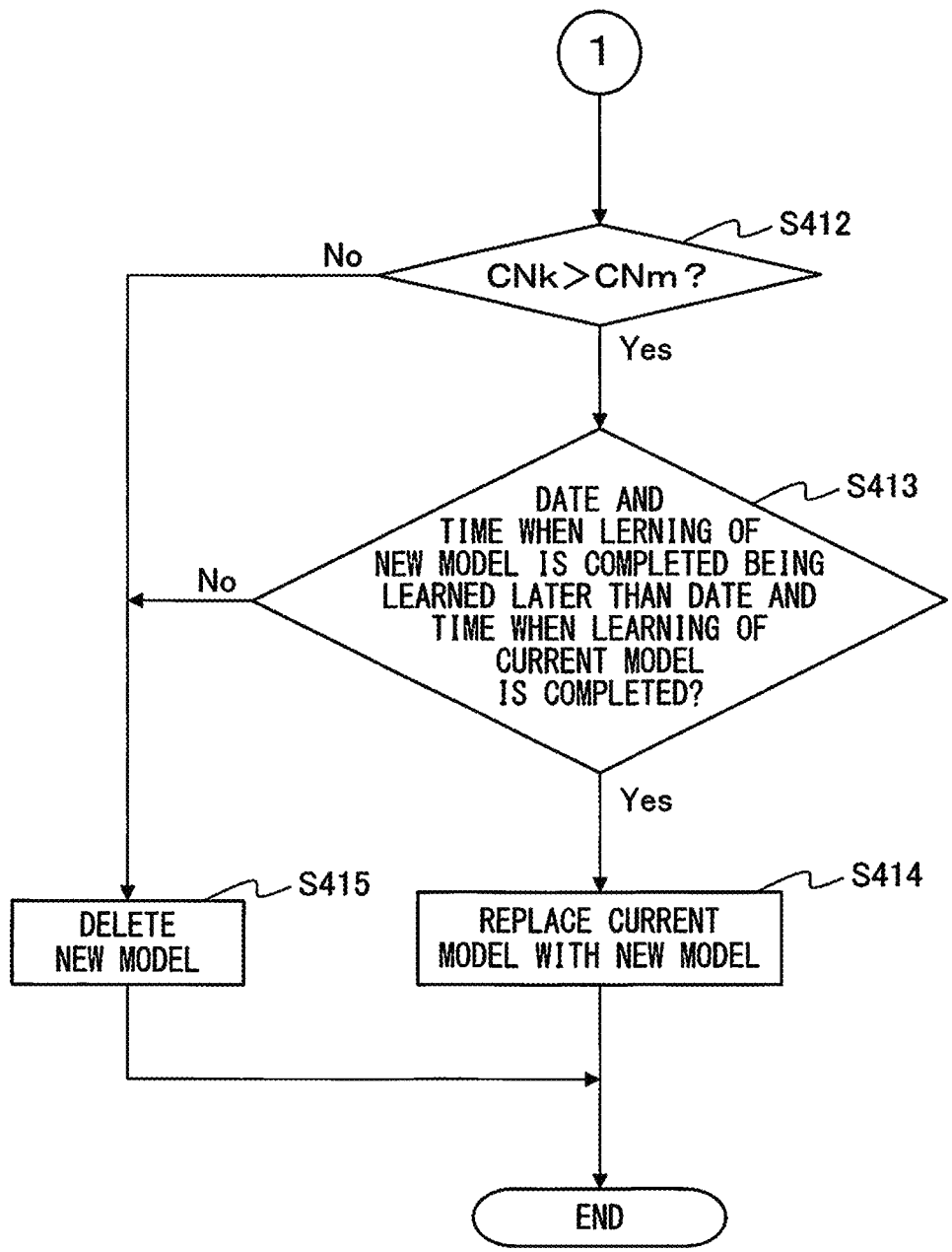
FIG. 8B is a flow chart showing a control routine of processing for replacement of models in the fourth embodiment.
Figure 8C:
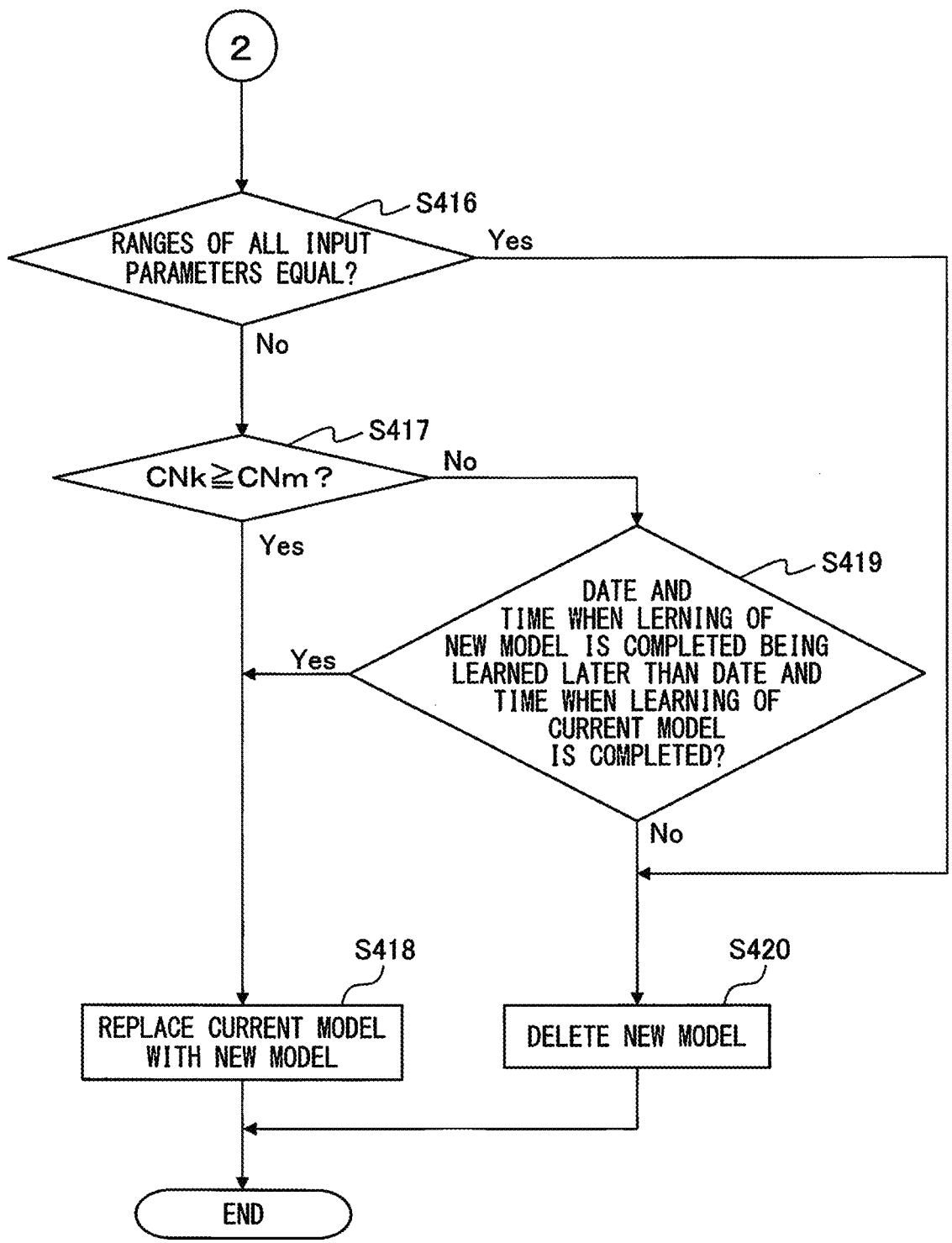
FIG. 8C is a flow chart showing a control routine of processing for replacement of models in the fourth embodiment.

FIG. 8A to FIG. 8C are flow charts showing a control routine of processing for replacement of models in the fourth embodiment. The present control routine is repeatedly performed by the processor 24 of the server 2.

First, at step S401, it is judged whether a new model has been received from the vehicle 3. If it is judged that a new model has not been received from the vehicle 3, the present control routine ends. On the other hand, if it is judged that a new model has been received from the vehicle 3, the present control routine proceeds to step S402.

At step S402, the input parameter no. "k" of the new model is set to "1", the input parameter no. "m" of the current model is set to "1", the K flag Fk is set to zero, and the M flag Fm is set to zero.

Next, at step S403, it is judged whether the range RNG(k) of the k-th input parameter used for learning of the new model is equal to or greater than the range RNG(m) of the m-th input parameter used for learning of the current model. If it is judged that the range RNG(k) of the k-th input parameter is equal to or greater than the range RNG(m) of the m-th input parameter, the present control routine proceeds to step S404. At step S404, the K flag Fk is set to "1".

Next, at step S405, it is judged whether the M flag Fm is "1". If it is judged that the M flag Fm is zero, the present control routine proceeds to step S406. At step S406, "1" is added to the input parameter no. "k" of the new model and "1" is added to the input parameter no. "m" of the current model.

Next, at step S407, it is judged whether the input parameter no. "k" of the new model is N+1. N is the number of input parameters input to the neural network model and is 6 in the example of FIG. 5. If it is judged that the input parameter no. "k" of the new model is equal to or less than N, the present control routine returns to step S403 where the range of the next input parameter is compared.

On the other hand, if at step S403 it is judged that the range RNG(m) of the m-th input parameter is broader than the range RNG(k) of the k-th input parameter, the present control routine proceeds to step S409. At step S409, the M flag Fm is set to "1".

Next, at step S410, it is judged whether the K flag Fk is "1". If it is judged that the K flag Fk is zero, the present control routine proceeds to step S406. At step S406, "1" is added to the input parameter no. "k" of the new model and "1" is added to the input parameter no. "m" of the current model.

Next, at step S407, it is judged whether the input parameter no. "k" of the new model is N+1. If it is judged that the input parameter no. "k" of the new model is equal to or less than N, the present control routine returns to step S403 and the range of the next input parameter is compared.

On the other hand, if at step S405 it is judged that the M flag Fm is "1" or if at step S410 it is judged that the K flag Fk is "1", the present control routine proceeds to step S411. In this case, the ranges of a part of the input parameters are broader at one model while the ranges of a part of the input parameters are broader at the other model. For this reason, at step S411, the new model is deleted from the storage device 22. That is, the current model is maintained and the new model is not stored in the storage device 22. After step S411, the present control routine ends.

Further, if at step S407 it is judged that the input parameter no. "k" of the new model is N+1, the present control routine proceeds to step S408. At step S408, it is judged whether the M flag Fm is "1". If the ranges of the plurality of input parameters which were used for learning of the current model are broader than the ranges of the plurality of input parameters which were used for learning of the new model, it is judged that the M flag Fm is "1" and the present control routine proceeds to step S412.

At step S412, in the same way as step S207 of FIG. 6, it is judged whether the number CNk of combinations of the plurality of input parameters which were used for learning of the new model is greater than the number CNm of combinations of the plurality of input parameters which were used for learning of the current model. If it is judged that the number CNk of combinations of the plurality of input parameters is greater than the number CNm of combinations of the plurality of input parameters, the present control routine proceeds to step S413.

At step S413, it is judged whether the date and time when learning of the new model finishes is completed is later than the date and time when learning of the current model is completed. In the fourth embodiment, the date and time when learning of the neural network model is completed is stored as a part of the information of the learned neural network model in the memory 32 of the ECU 30 or another storage device provided at the vehicle 3. For this reason, when the processor 24 of the server 2 receives a new model from the vehicle 3, it is possible to acquire the date and time when learning of the new model is completed.

Further, when the new model is stored in the storage device 22, the date and time when learning of the new model is completed is stored in the storage device 22. For this reason, the processor 24 of the server 2 can acquire the date and time when learning of the current model is completed.

If at step S413 it is judged that the date and time when learning of the new model is completed is later than the date and time when learning of the current model is completed, that is, if it is judged that the new model is the newest model, the present control routine proceeds to step S414. At step S414, the current model is replaced by the new model. That is, the current model is deleted from the storage device 22, while the new model is stored in the storage device 22. After step S414, the present control routine ends.

On the other hand, if at step S412 it is judged that the number CNk of combinations of the plurality of input parameters is equal to or less than the number CNm of combinations of the plurality of input parameters or if at step S413 it is judged that the date and time when learning of the new model is completed is not later than the date and time when learning of the current model is completed, the present control routine proceeds to step S415.

At step S415, the new model is deleted from the storage device 22. That is, the current model is maintained and the new model is not stored in the storage device 22. After step S415, the present control routine ends.

On the other hand, if the ranges of the plurality of input parameters which were used for learning of the new model are broader than the ranges of the plurality of input parameters which were used for learning of the current model, at step S408, it is judged that the M flag Fm is zero and the present control routine proceeds to step S416. Note that, in this case, the K flag Fk is set to "1".

At step S416, it is judged whether the ranges of all of the input parameters are equal between the new model and the current model. If it is judged that the ranges of all of the input parameters are equal, the present control routine proceeds to step S420.

At step S420, the new model is deleted from the storage device 22. That is, the current model is maintained and the new model is not stored in the storage device 22. After step S420, the present control routine ends.

On the other hand, if the ranges of the plurality of input parameters which were used for learning of the new model are broader than the ranges of the plurality of input parameters which were used for learning of the current model, at step S416, it is judged that the ranges of all of the input parameters are not equal and the present control routine proceeds to step S417.

At step S417, it is judged whether the number CNk of combinations of the plurality of input parameters which were used for learning of the new model is equal to or more than the number CNm of combinations of the plurality of input parameters which were used for learning of the current model. If it is judged that the number CNk of combinations of the plurality of input parameters is smaller than the number CNm of combinations of the plurality of input parameters, the present control routine proceeds to step S419.

At step S419, in the same way as step S413 of FIG. 8B, it is judged whether the date and time when learning of the new model is completed is later than the date and time when learning of the current model is completed. If it is judged that the date and time when learning of the new model is completed is not later than the date and time when learning of the current model is completed, the present control routine proceeds to step S420.

At step S420, the new model is deleted from the storage device 22. That is, the current model is maintained and the new model is not stored in the storage device 22. After step S420, the present control routine ends.

On the other hand, if at step S417 it is judged that the number CNk of combinations of the plurality of input parameters is equal to or more than the number CNm of combinations of the plurality of input parameters or if at step S419 it is judged that the date and time when learning of the new model is completed is later than the date and time when learning of the current model is completed, the present control routine proceeds to step S418.

At step S418, the current model is replaced by the new model. That is, the current model is deleted from the storage device 22 and the new model is stored in the storage device 22. After step S418, the present control routine ends.

<Other Embodiments>

Above, preferred embodiments according to the present invention were explained, but the present invention is not limited to these embodiments and can be corrected and changed in various ways within the language of the claims. For example, the input parameters and output parameters of the neural network model are not limited to the above examples. Any parameters able to be acquired in a vehicle may be included.

Further, a plurality of neural network models may be stored in the storage device 22 of the server 2. For example, a plurality of neural network models having different input parameters and output parameters may be stored in the storage device 22 of the server 2. In this case, when a new model is sent from a vehicle to the server 2, the current model having the same input parameters and output parameters as the new model is compared with the new model.

Further, a plurality of the neural network models having the same input parameters and output parameters may be stored in the storage device 22 of the server 2. For example, a plurality of the neural network models having the same input parameters and output parameters are classified by models of vehicles, regions in which measured values of the input parameters and output parameters are acquired, etc. In this case, when a new model is sent from a vehicle to the server 2, the current model corresponding to the new model is compared with the new model. Further, when there are a plurality of current models corresponding to the new model, the plurality of the current models are respectively compared with the new model.

Further, the above embodiments can be worked combined in any way. For example, the second embodiment can be combined with the third embodiment. In this case, in the control routine of FIG. 7, instead of step S307, step S206 to step S209 of FIG. 6 are performed.

Further, the second embodiment can be combined with the fourth embodiment. In this case, in the control routine of FIG. 8A to FIG. 8C, after the judgment of step S416 of FIG. 8C is yes, instead of step S420, step S207 to step S209 of FIG. 6 are performed.

Further, the third embodiment can be combined with the fourth embodiment. In this case, in the control routine of FIG. 7, after the judgment of step S302 is no, instead of step S303 to step S308, step S402 to step S420 of FIG. 8A to FIG. 8C are performed. Similarly, the second embodiment, the third embodiment, and the fourth embodiment can also be combined.

REFERENCE SIGNS LIST 1 model aggregation system
2 server
21 communication interface
22 storage device
24 processor
3 vehicle
30 electronic control unit (ECU)
36 communication module

The invention claimed is:

1. A model aggregation device, comprising:
a communication device configured to communicate with a plurality of vehicles in which neural network models are learned by the plurality of vehicles;
a non-transitory memory storing a part of the neural network models sent from the plurality of vehicles; and
a control device, wherein
a neural network model of the neural network models is configured to output at least one output parameter from a plurality of input parameters, and
the control device is configured to, in response to receiving a new neural network model from one vehicle among the plurality of vehicles through the communication device,
compare first ranges of the plurality of input parameters which were used for learning the new neural network model and second ranges of the plurality of input parameters which were used for learning a current neural network model stored in the non-transitory memory to thereby determine whether to replace the current neural network model with the new neural network model, wherein in comparing the first ranges and the second ranges, corresponding types of the plurality of input parameters of the new neural network model and the current neural network model are compared.

2. The model aggregation device according to claim 1, wherein
the control device is configured to replace the current neural network model with the new neural network model in response to
the first ranges being broader than the second ranges,
a first number of combinations of the plurality of input parameters which were used for learning the new neural network model being smaller than a second number of combinations of the plurality of input parameters which were used for learning the current neural network model, and
first date and time when the new neural network model finishes being learned being later than second date and time when the current neural network model finishes being learned.

3. The model aggregation device according to claim 1, wherein
the control device is configured to replace the current neural network model with the new neural network model in response to
the first ranges being narrower than the second ranges,
a first number of combinations of the plurality of input parameters which were used for learning the new neural network model being greater than a second number of combinations of the plurality of input parameters which were used for learning the current neural network model, and
first date and time when the new neural network model finishes being learned being later than second date and time when the current neural network model finishes being learned.

4. The model aggregation device according to claim 1, wherein
the control device is configured to replace the current neural network model with the new neural network model in response to the first ranges being broader than the second ranges.

5. The model aggregation device according to claim 1, wherein
the control device is configured to replace the current neural network model with the new neural network model in response to
the first ranges being equal to the second ranges, and
a first number of combinations of the plurality of input parameters which were used for learning the new neural network model being greater than a second number of combinations of the plurality of input parameters which were used for learning the current neural network model.

6. The model aggregation device according to claim 1, wherein
the control device is configured not to replace the current neural network model with the new neural network model in response to a value of at least one of the plurality of input parameters which were used for learning the new neural network model being outside of a predetermined range.

7. A model aggregation system, comprising:
a server; and
a plurality of vehicles, wherein
each of the plurality of vehicles comprises:
a first communication device configured to communicate with the server and
a first control device configured to perform learning of a neural network model outputting at least one output parameter from a plurality of input parameters,
the server comprises:
a second communication device configured to communicate with the plurality of vehicles,
a non-transitory memory storing a part of the neural network model of neural network models sent from the plurality of the vehicles, and
a second control device, and
the second control device is configured to, in response to receiving a new neural network model from one vehicle among the plurality of vehicles through the first communication device and the second communication device, compare first ranges of the plurality of input parameters which were used for learning the new neural network model and second ranges of the plurality of input parameters which were used for learning a current neural network model stored in the non-transitory memory to thereby determine whether to replace the current neural network model with the new neural network model, wherein in comparing the first ranges and the second ranges, corresponding types of the plurality of input parameters of the new neural network model and the current neural network model are compared.

* * * * *